Dec. 8, 1970     H. KORRENN     3,545,828

PLAIN BEARING

Original Filed July 22, 1966     2 Sheets-Sheet 2

INVENTOR
HEINRICH KORRENN

BY *Stevens, Davis, Miller & Mosher*
ATTORNEYS

United States Patent Office 3,545,828
Patented Dec. 8, 1970

3,545,828
PLAIN BEARING
Heinrich Korrenn, Schweinfurt, Germany, assignor to Kugelfischer Georg Schafer & Co., Schweinfurt, Germany
Continuation of application Ser. No. 567,195, July 22, 1966. This application May 15, 1969, Ser. No. 824,972
Claims priority, application Germany, July 30, 1965, K 56,771
Int. Cl. F16c 17/06
U.S. Cl. 308—160                                    5 Claims

ABSTRACT OF THE DISCLOSURE

A hydrostatically operating spherically shaped plain bearing having a rotatable bearing member supported with respect to a stationary bearing member through the medium of a fluid layer. At least three pads are adjustably mounted on the stationary member between the rotatable and stationary members. A face portion of each pad adjacent the rotatable bearing member has a trough formed therein, and is spherically shaped to conform to a complementary spherically shaped surface of the rotatable bearing member. Means are provided to feed to the trough fluid under pressure which will overflow the peripheral walls of each pad to establish the fluid support layer.

---

This application is a continuation of my copending application Ser. No. 567,195, filed July 22, 1966, now abandoned.

The invention relates to a plain bearing with a rotatable bearing member having a spherically shaped bearing surface supported with respect to a stationary bearing member through the medium of a fluid layer which is formed with the aid of at least two pads disposed symmetrically at widely separated points around the periphery of the bearing, each of the pads having a complementary spherically shaped base adjacent to and cooperating with the aforesaid spherically shaped bearing surface.

Crude precursors of bearings of this kind, but without the refinements described below, are known as so-called Michell bearings (see Gersdorfer "The Plain Bearing," 1954, page 33). In these bearings, the pads are formed by segments which automatically adjust themselves, under hydrodynamic pressure, to predetermined wedge angles. The hydrodynamic pressure is produced by the rotating bearing member forcing lubricant against the segments. When the rotation stops and the delivery of lubricant ceases, the hydrodynamic pressure terminates and therefore so does the fluid layer by which the plain bearing action had been obtained until then.

In such a hydrodynamically operating plain bearing, when the normally rotating bearing member is stationary, the support through the medium of a layer of fluid is not present. Every time the bearing stops, there is direct contact between the normally rotating bearing member and the segments. This static friction or at least stick-slip friction must be overcome each time a Michell bearing is set in operation before it again becomes a hydrodynamically operating plain bearing. Consequently, when such a bearing is set in motion, shocks or shuddering can arise, which can be so troublesome in many applications that often the possibility of using hydrodynamic bearings has to be dropped. Moreover, the reliable operation of a Michell bearing depends on high peripheral speeds which are not always present in situations suitable for plain bearings. The hydrodynamic plain bearing is accordingly not suitable for low-speed running.

These disadvantages of the broadly known plain bearings, which operate with a rotatable bearing member supported from a stationary member through the medium of a fluid layer, and in which the fluid layer is formed with the aid of at least two pads (segments) for the fluid, disposed symmetrically at points which are widely separated around the periphery of the bearing, are overcome according to the present invention by providing a fluid layer under hydrostatic pressure in at least one trough-shaped recess defined in each of a plurality of pads and by the peripheral walls of the trough being adjustable in relation to the stationary bearing member and by the uniformity of its separation from the rotatable bearing member. In contrast to the broadly old hydrodynamic Michell bearing, a plain bearing operating hydrostatically in this manner has, apart from those advantages to which attention has already been drawn in overcoming the deficiencies of the Michell bearing, also the further advantage that one can produce reliable bearings in which large rotating surfaces are present without any non-uniform pressure distributions arising, such as for example in a vertical boring mill or lathe. The above-mentioned adjustability of the spacing of the peripheral walls of the trough from the stationary bearing member and the uniformity of its distance from the rotatable bearing member gives the the advantage, for a hydrostatically operating plain bearing constructed in this manner, that the capacity of the bearing can be made as favorable as possible simultaneously with the use of the minimum amount of fluid continuously passing through the troughs in the pads.

According to the preferred embodiment of the invention, the hydrostatic plain bearing already defined can be distinguished by the provision of a spherically convex bearing member having its center of curvature on the axis of the bearing and by correspondingly shaping the cooperating peripheral walls of the trough. Primarily, such a construction eliminates errors in alignment of the axis of the bearing without requiring any special steps to be taken. Moreover, this spherical form of the stated components, in conjunction with a particular form of the rear face of the pad to be explained further later, opens up the possibility of achieving the previously mentioned adjustability of the position of the peripheral walls of the trough.

This adjustability can, however, be achieved, according to a further feature of the invention, by means of a fluid layer in each of at least three pads disposed symmetricaly around the periphery of the bearing and by supporting each pad in a universally tiltable manner with respect to the stationary bearing member through a ball disposed between the pad and the stationary bearing member, the ball being located in a seat in one of these elements and in a blind hole in the other. The adjustment of the spacing of the peripheral wall of the trough provided in this manner is particularly suitable for oblique pedestal bearings as illustrated hereinafter.

A further feature of the invention involves providing at least one fluid layer disposed in a second trough-shaped recess in the rear face of each pad which also subject to hydrostatic pressure. Here again, there is provision for adjustment of the spacing of the peripheral walls of the trough from the stationary bearing member and the uniformity of its distance from the rotatable bearing member, giving the advantages already explained.

Another feature of the invention comprises, in conjunction with the features already mentioned, a stationary bearing member comprising a base and at least three adjusting pieces which are slidable with respect to it.

The means for accomplishing the foregoing objects and other advantages, which will be apparent to those skilled in the art, are set forth in the following specification and claims and are illustrated in the accompanying drawings. Reference is made now to the drawings in which:

Figure 1:
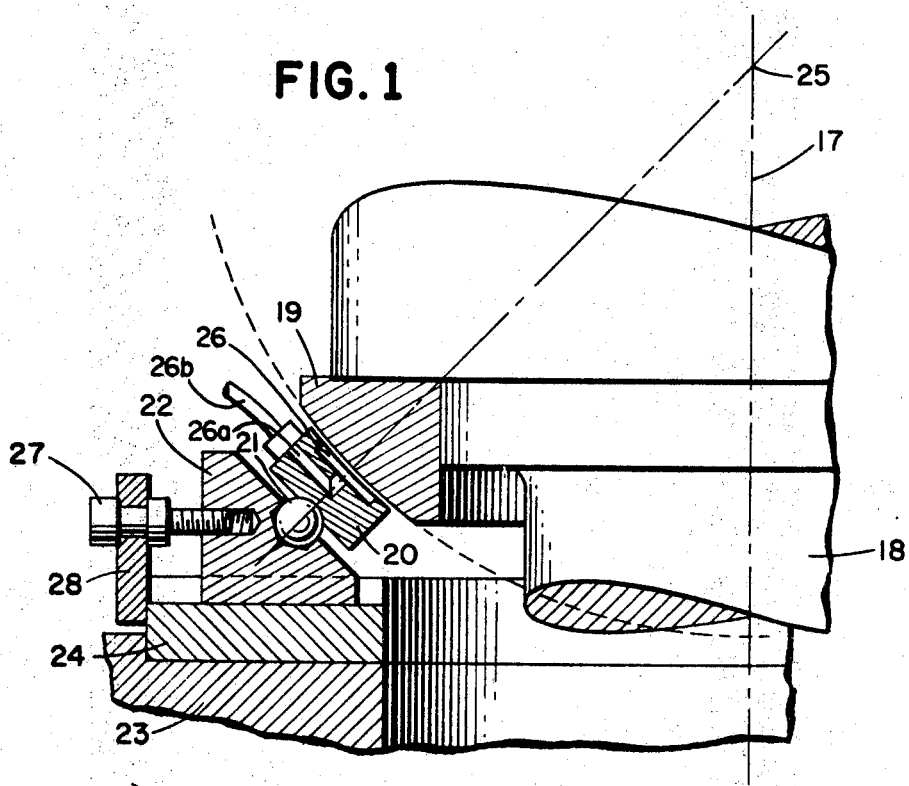
FIG. 1 is a partial sectional view of an oblique pedestal bearing.
Figure 2:
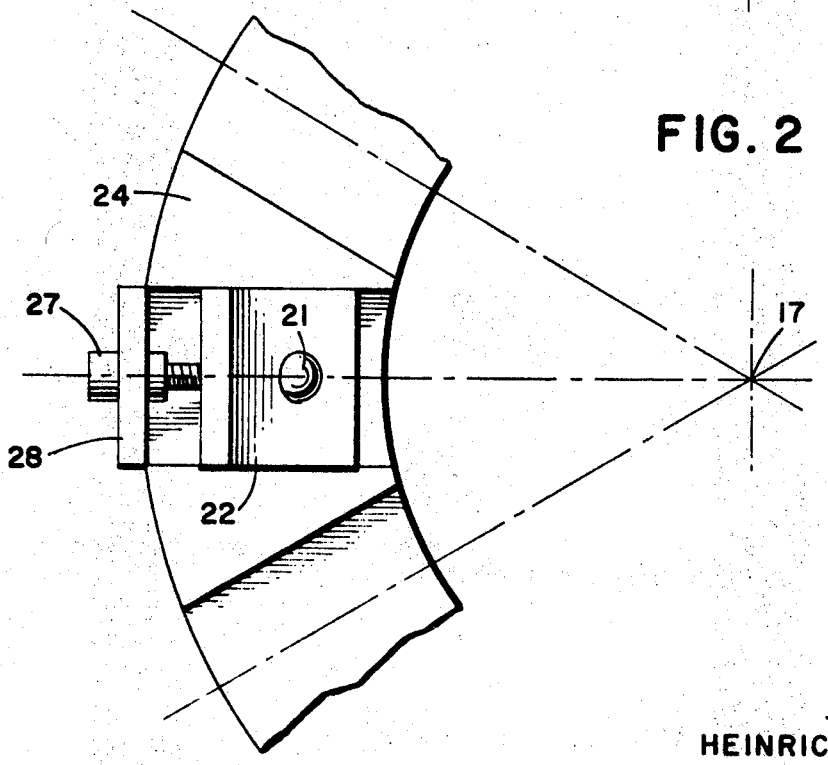
FIG. 2 is a partial plan view of the adjusting portion of the oblique pedestal bearing of FIG. 1.

Referring to the oblique pedestal bearing of FIGS. 1 and 2, a shaft 18 is rotatable about an axis 17. A rotatable bearing member 19 is rigidly secured to the shaft 18 and is supported in the manner of an oblique pedestal bearing through a pad 20, ball 21 and adjusting piece 22 situated on a stationary bearing member 24 rigidly secured to a frame 23. A fluid supporting layer is formed with the aid of at least three pads 20 disposed symmetrically at widely circumferentially spaced points around the shaft 18.

The bearing member which is stationary in relation to the axis of rotation 17 comprises the stationary bearing member 24 rigidly secured on the housing or frame 23, only a portion of which has been shown. On the stationary bearing member 24 there is a retaining means 28 for an adjusting screw 27 of an adjusting piece 22, in the latter of which a ball 21 rests partially enclosed in a blind hole. The upper part of the ball 21 is received in a seat in pad 20 in such a manner that an intermediate space is left between the adjusting piece 22 and the pad 20.

On the side of the pad 20 facing away from the ball 21, there is a trough or recess 26 which is connected through a suitable passage 26a and conduit 26b to a fluid pump (not shown). A bearing ring 19 is rigidly secured to the rotatable shaft 18 so that the ring 19 forms the rotatable bearing member which is mounted above trough 26 in relation to the stationary bearing member situated therebelow.

The pad 20 is disposed between the rotatable and stationary bearing members and through the passage of the pad, a fluid, preferably oil, passes into the trough 26 and out through the annular gap formed between the peripheral walls of the trough (including the face of the pad) and the opposing surface of the bearing ring 19. The position of the pad 20 continuously adjusts itself by supporting itself on the ball 21 so that the size of the annular gap remains substantially uniform across the peripheral wall of the trough. With the aid of the screw 27, the mean position of the peripheral walls of the trough 26 can be adjusted so that, for example, with more than three pads disposed around the axis 17, the gap is the same for all pads. Accordingly, all the supporting points for the bearing in question will under operating conditions take an equal share of the total load.

From FIG. 1 it is evident that the surface defined by the peripheral walls of the trough formed in each pad 20 (including its face) is curved spherically, with the center of curvature lying on the axis 17 of the bearing. A spherical curvature, with the same center of curvature, is also provided on the rotatable bearing member 19 to cooperate with that of the pad 20. The curvature of the rotatable bearing member 19, in conjunction with the correspondingly curved cooperating surface of the peripheral walls of the trough 26 in the pad 20, including its face, allows errors in the direction of the axis 17 to be compensated for by tilting the spherical surfaces with respect to each other.

The hydrostatic pressure is provided for in the manner explained above. Also the adjustability of the spacing of the peripheral wall of the trough 26 from the stationary bearing member 24 and the uniformity of its distance from the rotatable bearing member 19 is likewise provided by the screw 27 which allows the adjusting piece 22 to be displaced appropriately with respect to retaining means 28.

Figure 3:
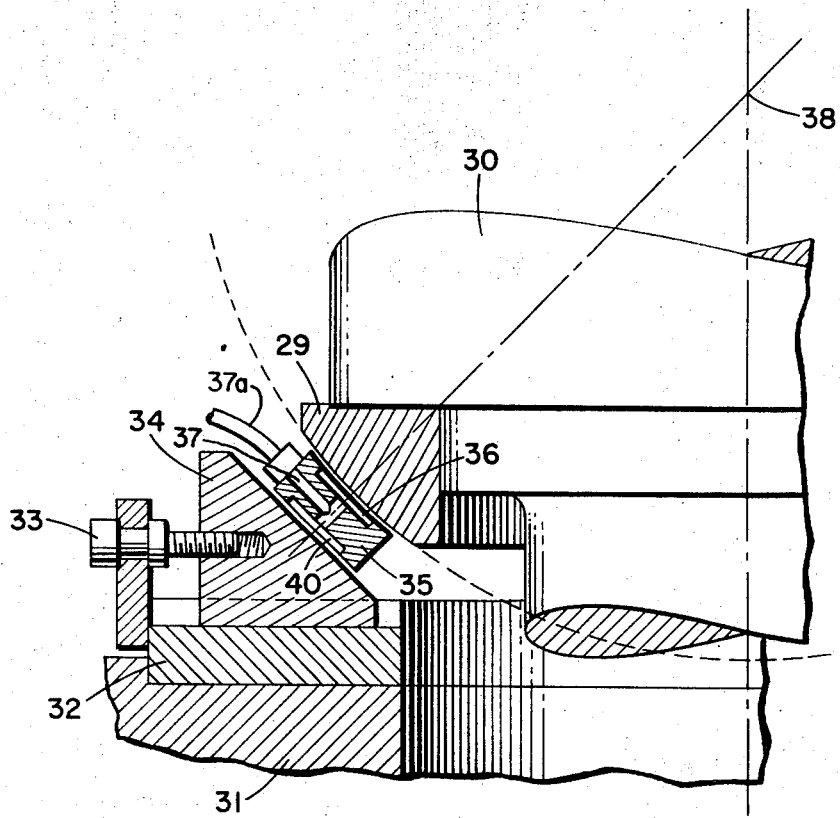
FIG. 3 is a sectional view of another oblique pedestal bearing.

Referring now to the oblique pedestal bearing of FIG. 3, a rotatable bearing member 29, which is rigidly secured to a shaft 30, is supported with respect to a stationary bearing member 32 through adjusting piece 34, pad 35, and a fluid layer which is provided by fluid flowing through a passage 37 from conduit 37a, trough 36, and then flowing out through the annular space between the peripheral walls of the trough 36 and the rotatable bearing member 29. In this construction, there is an oblique bearing similar to that described earlier, with bearing member 32 fixedly mounted on frame 31, screw means 33 moving adjusting piece 34, and the fluid entering passage 37 from a pump (not shown). The previously described supporting positions must be provided at three points spaced equally around the periphery of the bearing to achieve reliable static support.

As already explained in the description of the arrangement of FIG. 1, the surface of the rotatable bearing member 29 facing the pad 35 is spherically curved with the center of curvature 38 lying on the axis 39 of the shaft 30. The surface formed by the peripheral walls of the trough 36 have a corresponding curvature. In this arrangement errors of alignment of the bearing are compensated for by appropriate orientation of the rotatable bearing member 29 in relation to the stationary bearing member 32 by means of these mutually tiltable components.

In this embodiment a uniform gap at the periphery of the trough 36 between its walls and the opposing surface of the rotatable bearing member 29 is not, however, obtained by a ball provided between the pad 35 and the adjusting piece 34 as in FIG. 1. Instead, a further trough 40 is provided in the rear face of the pad 35 to cooperate with the adjusting piece 34 with hydrostatic pressure built up therebetween. This pressure is also obtained from fluid entering through the passage 37 in the pad 35 and escaping through the annular gap aroud the trough 40.

The plain bearing according to this invention, in addition to the previously discussed advantages, forms an example of a bearing which allows repair or replacement to be carried out at each individual position in the overall bearing support, i.e., in one of the pads, provided that a sufficient number of such pads are present around the periphery of the bearing. Furthermore, the plain bearing according to this invention is distinguished by the feature that it requires no high degree of mounting accuracy in the housings in which it is to be incorporated.

I claim:

1. A hydrostatically operating spherically shaped plain bearing system for supporting a massive rotatable member such as a rotatable vertical shaft comprising a rotatable member and a rotatable bearing member having a spherically shaped bearing surface, a stationary bearing member, said rotatable bearing member being rigidly fixed to said rotatable member, means for creating a fluid layer under hydrostatic pressure intermediate said bearing members and adapted to support said rotatable bearing member, said stationary bearing member comprising a fixedly mounted ring-shaped support, at least three pad supports symmetrically spaced about the periphery of said ring-shaped support and movably supported thereon, means to individually adjust the radial position of each of said pad supports with respect to the rotatable bearing member, a pad disposed on each of said pad supports, each of said pads having a face portion disposed adjacent the spherically shaped bearing surface of said rotatable bearing member, said face portion being complementarily shaped to mate and cooperate with the correspondingly spherically shaped bearing surface of the rotatable bearing member, a recess in the face portion of each pad, and conduit means connected to a source of fluid under pressure and arrangeed to feed fluid under pressure to the recesses in said pads so as to flow out over said face portions to create and maintain said fluid layer between said pads and the spherically shaped bearing surface of said rotatable bearing member in all operating conditions of the bearing system.

2. A bearing system according to claim 1 in which said radial adjustment means comprises groove means in said ring-shaped support, each said pad support being lidably mounted in said groove means, retaining means fixedly mounted on said ring-shaped support, screw adjusting means operatively connected between said pad support and said retaining means to enable varying of the spacing between the face of said pad and the surface of said rotatable bearing member to thereby adjust the uniformity of the distance of said pad from said rotatable bearing member.

3. A bearing system according to claim 1 further comprising universal pivotal means pivotally mounting each of said pads on its respective pad support, said pivotal means comprising ball means, a blind hole in said pad support and a seat in said pad, said ball means engaging both said hole and said seat.

4. A bearing system according to claim 1 in which the spherically shaped bearing surface of said rotatable bearing member has its center of curvature on the bearing axis and said face portion of each of said pads has a spherically shaped surface having its center of curvature on the bearing axis.

5. A bearing system according to claim 1 wherein each of said pads has a second recess on a second face portion on the side of the pad opposite said first face portion, each of said recesses on said second face portion having a peripheral wall and being connected to said conduit means for feeding pressurized fluid to said second recess to thereby provide a second fluid layer subject to hydrostatic peessure between the second face portion of said pad and the surface of said pad support.

References Cited

UNITED STATES PATENTS

| 2,061,966 | 11/1936 | Howarth | 308—160 |
| 3,052,505 | 9/1962 | Trotter | 308—160 |
| 2,710,234 | 6/1955 | Hansen | 308—9 |
| 1,117,505 | 11/1914 | Kingsbury | 308—160 |

FRED C. MATTERN, JR., Primary Examiner

F. SUSKO, Assistant examiner